United States Patent [19]

Shabeer

[11] Patent Number: 5,446,571

[45] Date of Patent: Aug. 29, 1995

[54] MANCHESTER CODE OPTICAL CODE RECOGNITION UNIT

[75] Inventor: Mohammed Shabeer, Suffolk, England

[73] Assignee: British Telecommunications, plc, London, England

[21] Appl. No.: 191,502

[22] Filed: Feb. 4, 1994

[30] Foreign Application Priority Data

Sep. 10, 1993 [EP]  European Pat. Off. ............ 93307144

[51] Int. Cl.[6] .......................... G02F 2/00; G02F 3/00; H04L 27/10; H04Q 11/00
[52] U.S. Cl. .................... 359/107; 359/108; 359/117; 359/125; 359/188; 375/282; 375/333; 385/16
[58] Field of Search ............. 359/107, 108, 183, 117, 359/g35; 375/55, 87; 385/16

[56] References Cited

U.S. PATENT DOCUMENTS

| | | | |
|---|---|---|---|
| 4,371,847 | 2/1983 | Biard et al. | |
| 4,545,076 | 10/1985 | Biard et al. | |
| 4,661,952 | 4/1987 | von Sichart et al. | |
| 5,220,582 | 6/1993 | Kaharu et al. | 359/183 |
| 5,274,673 | 12/1993 | Kaharu et al. | 359/183 |

FOREIGN PATENT DOCUMENTS

WO91/18485  11/1991  WIPO.
WO93/14604  7/1993  WIPO.

OTHER PUBLICATIONS

Morris, "Code your Fiber-optic Data For Speed, Without Losing Circuit Simplicity", Design Engineering, Electronic Design 22, Oct. 25, 1978, pp. 84–91.
Izadpanah, "Direct Timing Extraction in a Modified—Manchester Coded Picosecond Optical Pulse Fibre Optic Transmission System", Electronics Letters, vol. 24, No. 18, 1 Sep. 1988, pp. 1151–1153.
Prucnal et al, "Optically-Processed Routing for Fast Packet Switching" IEEE-LCS The Magazine of Lightwave Communications Systems, 1 May 1990, No. 2, New York
Hansen et al, "Optical Demultiplexing at 6 Gb/s Using A Semiconductor Laser Amplifier as an Optical Gate", IEEE Transactions Photonics Technology Letters, vol. 3, No. 11, pp. 1018–1020.

*Primary Examiner*—Martin Lerner
*Attorney, Agent, or Firm*—Nixon & Vanderhye

[57] ABSTRACT

An optical code recognition unit (OCRU) for recognising a predetermined n-bit optical code sequence coded using the Manchester code format, has an n-way splitter (7) having an input and n parallel outputs (7a). A plurality of gates (9a, 9b, 9c, 9d) are associated with the splitter outputs (7a), respective pairs of splitter outputs leading to each of the gates ( 9a, 9b, 9c) via a respective optical combiner (8a, 8b, 8c), and any remaining single splitter output leading directly to its gate (9d). Each of the splitter outputs (7a) is subject to a different delay of m half bit periods, where m=0 to 2(n−1), the values of m being chosen such that, if a predetermined optical code sequence is applied to the splitter input, the '1's in the outputs of each of the pairs of splitter outputs (7a) reach the associated AND gates (9a, 9b, 9c) and the '1' in any remaining single splitter output (7a) reaches its AND gate (9d) at predetermined times such that all the gates are turned on.

12 Claims, 1 Drawing Sheet

(a)
1 represented as 01

(b)
0 represented as 10

MANCHESTER CODE OPTICAL CODE RECOGNITION UNIT

This invention relates to optical processing in networks carrying packetised signals, and in particular to an all-optical code recognition unit for such a network.

BACKGROUND OF THE INVENTION

Optical fiber communication offers many advantages over conventional wire based systems, these advantages including reduced losses, increased bandwidth, immunity from electromagnetic interference (EMI), and a high level of security. The application of optical fiber technology into the local area network (LAN) is, therefore, of increasing interest. In the past, however, it has been assumed that optical networks will only penetrate small business and residential sectors if new broadband services are provided to offset the additional costs involved in the installation of the optical technology. Some of the broadband services that could be provided are alpha-numeric videotex (e.g. Prestel), photographic videotex, high definition television, interactive video on demand (video library), video telephony, interactive graphics and high-speed data services.

Although the importance of providing such services has been recognised for some time, it is difficult for telecommunications operating companies to predict their market potential and therefore justify a major investment. What is required is an entry strategy that allows optical technology to be installed economically for telephony and low-speed data services, while maintaining the potential for evolution at a marginal cost for future broadband services.

In known optical networks, routing of information is achieved at each node by electronic means, that is to say by detecting the received optical signal to give an electrical signal (plus detector noise). This electrical signal must be regenerated, after processing and switching to remove the noise, before the signal is re-transmitted optically. Regeneration is bit-rate dependent, and so restricts the information type that can be carried, thereby preventing the transmission of broadband services. The need for regeneration could be removed by coupling off, at each node, part of the received optical signal, the coupled-off signal being converted to an electronic signal which is electronically processed, the remaining uncoupled optical signal being re-routed by the electronic processor. Unfortunately, the electronic processing times severely limit the possible capacity of the optical links, so again the provision of broadband services is not practical. Thus, although the electronic processor can switch quickly (of the order of nanoseconds) it requires a relatively long time (of the order of microseconds) to process, and therefore to decide upon the necessary route of the signal. In this scheme, the uncoupled optical signal is delayed during the processing time by a long length of optical fiber, and this obviously increases the size of each switching node.

Optical routing of information at the nodes of such an optical network would increase the capacity of the network by reducing the processing time. Not only would this increase the capacity of the network, it would also decrease the vast delay lengths of optical fiber otherwise required. Optical signal processing is well known, but the particular method of optical routing in a given network will depend upon the nature of that network. A particularly advantageous type of optical network is the recently developed telephony over passive optical networks (TPON). This type of network has no routing mechanisms, that is to say all terminals receive all the information transmitted by the exchange. One of the main advantages offered by TPON is the ability to move transmission between customers. This is because the gross bit-rate used with TPON is 20 Mbit/s (chosen mainly to allow cheap CMOS realisation of signal processing chips), and this is divided into a basic granularity of 8 kbit/s, that is to say 8 kbit/s is the basic transmission unit that can be moved from customer to customer (or can be summed to provide channels of nx8 kbit/s capacity). This ability suggests that TPON will be particularly applicable to the small business sector. TPON also shows great promise for the economic provision of optical fiber to the telephony customer, with major potential for later extension to broadband integrated services digital networks (ISDN).

In order to enhance management and flexibility of the core of the network of the telecommunications network, a synchronous digital hierarchy (SDH) managed transmission network is planned as a replacement for the present asynchronous trunk and junction networks. An SDH network would have four different levels, with a passive optical network (PON) at the lowest (Access) level, and a high capacity routed network at the upper (Inner Core or Long Haul) level. The Inner Core level would benefit the most from optically-controlled routing, as this level requires the largest capacity. The increase in capacity required at the Access level (because of the addition of extra services) would, however, benefit from the use of optical routing. At the Access level, it is envisaged that there would be sixty-four access points to each node. It would, therefore, be possible to address each individual node by a series of code sequences, each code sequence allowing up to sixty-four permutations.

One method of implementing an SDH network, that achieves flexibility and supports the divergent needs of future services, is based on packet switching which is currently used in data networks where error-free communication is required. The protocols required for such a system contain sophisticated methods for correcting, retransmitting or re-routing packets, and so need a lot of processing which can cause long delays. To accommodate delay-critical, but error-tolerant services, such as voice, a much simpler protocol can be used to minimise the processing time required. An example of this technique, which is known as asynchronous transfer mode (ATM) is used for fast packet switching or asynchronous time division (ATD).

ATM is a label multiplexing technique that uses short, fixed length packets, or cells. The ATM cells are short to reduce packetisation delay, and are of fixed length to make it easier to bound delays through switches and multiplexers. They have short labels (or headers) to allow cells to be routed, at high speeds, by means of hardware routing tables at each switch. For large transmission bandwidths (~1Gbit/s or more) this routing may be most effectively performed optically via optical code recognition (OCR).

The packet header and information fields must be separated at nodes where OCR of the header is to take place. This could be achieved by having the information field at bit-rates far in excess of the header bit rate and the response time of the optical code recognition unit (OCRU), so that the OCRU, being too slow to "see" the information field bit rate will only "see" a constant intensity after the header. Alternatively, and preferably, the header and information fields could be at different wavelengths, so that they may be split easily, either by a wavelength dependent coupler or by means of wavelength division multiplexing technology.

In developing a system of optical code recognition for use in optical routing of TPON, the following requirements must be met, namely:

(a) Around 64 codes are required with the minimum of redundancy. This is due to the SDH network requiring up to 64 codes at each level of the network adequately to address each access terminal;

(b) The OCRU should be self timing, that is to say a clock signal should not be required to synchronise the OCRU;

(c) The OCRU should be realised using the minimum number of components, thus keeping cost and complexity down;

(d) The match/mismatch decision of the OCRU must be achieved very quickly, that is to say the OCRU must have lower processing times than electronic systems; and (e) The logic level of the OCRU output should be kept to a minimum, since multiple level logic is easily degraded by the noise that is always present in real systems.

The specification of our International patent application GB 93/00090 describes an OCRU for recognising a predetermined n-bit optical code. The OCRU comprises an n-way splitter having an input and n parallel outputs, a plurality of combiners associated with the splitter outputs, and a respective gate controlled by the output of each of the combiners. Each of the splitter outputs is subject to a different delay of from 0 to $(n-1)$ bit periods, and each combiner receives an input from at least one of the splitter outputs. The OCRU is such that all the gates are turned on if a predetermined optical code is applied to the splitter input. Each combiner is configured to operate at 2-level logic, and the arrangement is such that, when the predetermined optical code is input to the n-way splitter, each combiner receives an input of one or more '0's or one or more '1's, and each combiner receiving '1' inputs receives a maximum of two such inputs.

With this arrangement, each gate receiving one or more '1's performs the 'AND' logic operation, and each gate receiving one or more '0's performs the 'INVERTER' logic operation. The disadvantage of this is that, although 'AND' logic operations can be implemented fairly easily in a number of technologies, for example by semiconductor based devices, fiber based devices (such as loop mirrors) or polymer devices, 'INVERTER' logic operations are much harder to implement. Another disadvantage of this known split-and-combine technique is that two bits (the first and last) must be used for identifying the start and end of an input code sequence, so the code efficiency of the technique is reduced to 25%.

SUMMARY OF THE INVENTION

The present invention provides an OCRU for recognising a predetermined n-bit optical code sequence coded using the Manchester code format, the OCRU comprising an n-way splitter having an input and n parallel outputs, and a plurality of AND gates associated with the splitter outputs, respective pairs of splitter outputs leading to each of the AND gates via a respective optical combiner, and any remaining single splitter output leading directly to its AND gate, wherein each of the splitter outputs is subject to a different delay of m half bit periods, where $m=0$ to $2(n-1)$, the values of m being chosen such that, if a predetermined optical code sequence is applied to the splitter input, the '1's in the outputs of each of the pairs of splitter outputs are input to the associated AND gates and the '1' in any remaining single splitter output is input to its AND gate at predetermined times such that all the AND gates are turned on.

Advantageously, the gates are positioned in series between an input device and an output device, whereby a signal input by the input device will reach the output device if the predetermined code is input to the n-way splitter. Preferably, the input to each of the AND gates except that nearest the input device is subjected to a predetermined delay, whereby the signal input by the input device will reach the AND gates at substantially the same time as said inputs. Each of the AND gates may be a semiconductor laser (SLA) amplifier.

The invention also provides a system for processing packetised signals in a network comprising a head-end packet signal transmitter and a plurality of customer receivers, the system comprising a respective apparatus associated with each customer receiver, each apparatus comprising separator means for separating header field information from data field information in packets, first transmission means for transmitting the header field information to a switch associated with the respective customer receiver, and second transmission means for transmitting the data field information to said switch, wherein each first transmission means includes an OCRU as hereinbefore defined, and wherein each apparatus is such that the respective OCRU activates the associated switch to permit the passage of the header field information of a given packet only if the optical code contained in the header field information of that packet is the predetermined optical code of that OCRU.

Conveniently, each of said switches is a bistable switch constituted by an SLA.

Advantageously, a respective wavelength-dependent coupler constitutes the separator means of each apparatus.

Preferably, the second transmission means of each apparatus includes an optical delay fiber of such a length that the header field information of a given packet reaches the switch substantially as the switch is activated by the OCRU.

Advantageously, the network is a packet switched network, the head-end packet signal transmitter is a head-end packet transmitter, and the packets are cells consisting of headers and data.

An optical routing apparatus incorporating an optical code recognition unit constructed in accordance with the invention will now be described in greater detail, by way of example, with reference to the accompanying drawings, in which:

DESCRIPTION OF THE PREFERRED EMBODIMENTS

Figure 1:
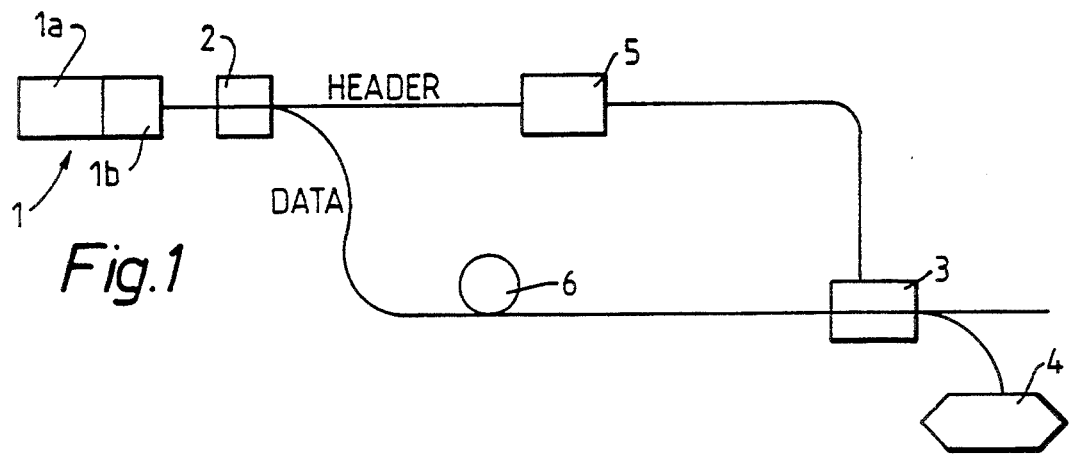
FIG. 1 is a schematic representation of the routing apparatus.

Referring to the drawings, FIG. 1 is a schematic representation of a customer-end optical routing apparatus for use with a TPON system carrying packetised signals (one cell of which is indicated by the reference numeral 1). Each cell 1 has a data field 1a and a header field 1b, these two fields being transmitted at different wavelengths. The customer-end routing apparatus includes a wavelength dependent coupler 2 which separates the header field information from the data field information. The header field information is fed to a bistable switch 3 (and then on to the customer's receiver 4) via an OCRU 5. The data field information is fed to the bistable switch 3 via a delay fiber 6. The bistable switch 3 is constituted by a split-contact laser amplifier having a maximum rise time of less than 200 psec.

The OCRU 5 is configured to a particular optical code which is unique to the customer concerned, the optical code corresponding to all or part of the header field 1b. The OCRU 5 will, therefore, provide an output signal only when it recognises the particular optical code appropriate to the customer. This output signal is used to control the bistable switch 3 so that the data field information is routed to the receiver 4. The delay fiber 6 is chosen to ensure that the data field 1a of the same cell 1 as the header field 1b recognised by the OCRU 5 is passed to the receiver 4. Consequently, signals (packets) intended for other customers will not be routed to that particular customer's receiver 4.

Figure 2:
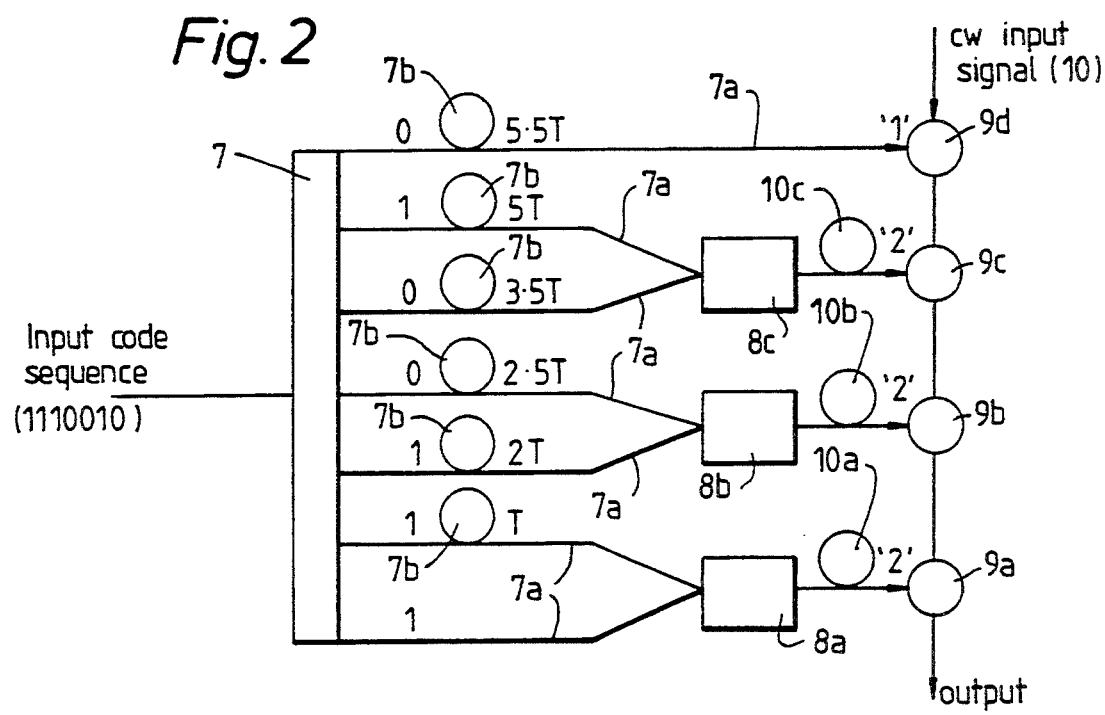
FIG. 2 is a schematic representation of a optical code recognition unit forming part of the apparatus of FIG. 1.

FIG. 2 shows the OCRU 5, this OCRU being configured to recognise the optical code 1110010. The OCRU 5 includes a passive seven-way optical splitter 7 having seven parallel output fibers 7a, three optical combiners 8a, 8b and 8c and four SLA gates 9a, 9b, 9c and 9d. Each of the fibers 7a is given a different delay so that the splitter 7 converts the serial input code into a parallel output code, with one bit of the code on each of the output lines 7a.

Figure 3A:
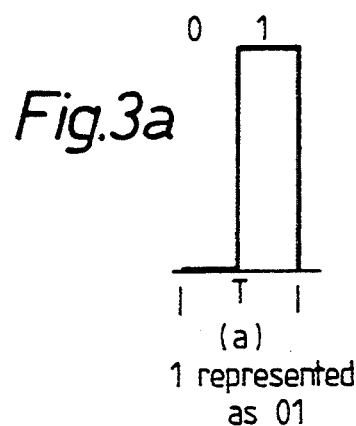
FIGS. 3a and 3b illustrate the Manchester code format used in the invention.
Figure 3B:
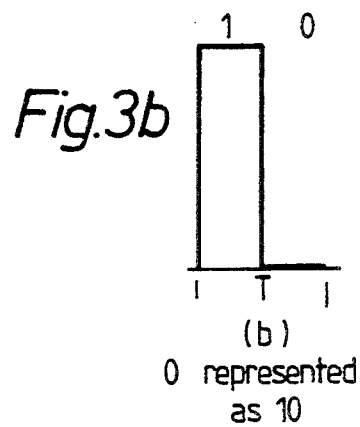

The OCRU 5 is configured to work with incoming code sequences coded using the Manchester code format. In this format (see FIGS. 3a and 3b), '1's and '0's are represented as 01 and 10 respectively in the input header code sequences, though it will be appreciated that the '1's and '0's could alternatively be represented by 10 and 01 respectively. In the optical domain, the transmitted levels of the header code sequences correspond to light 'on' or 'off' to represent the values of '1' and '0' respectively. The important point to note is that each bit period T has a signal of duration T/2 either in the first half (representing a '0') or the second half (representing a '1') of the bit period. It should also be noted that the Manchester code format does not double the number of bits in the input code sequence, but doubles the modulation bandwidth.

The architecture of the OCRU 5 (see FIG. 2) is such that the incoming code sequence 1110010 is split and differentially delayed. This is achieved by incorporating lengths of delay fiber 7b in each of the output lines 7a except that associated with the last bit of the input header (that is to say the most significant bit). The length of each of the delay fibers 7b is pre-selected so that the outputs on the output lines 7a reach the gates 9a to 9d at the same time. Because the input code is in the Manchester code format, this requires the delays on the lines to be 5.5 T, 5 T, 3.5 T, 2.5 T, 2 T, T and zero respectively for the bits of the input code, with the last bit of the input header having a zero delay.

In the particular OCRU 5 shown in FIG. 2, a first pair of output lines 7a (which carry the two most significant bits) are input into the optical combiner 8a, a second pair of output lines 7a (which carry the next two most significant bits) are input into the optical combiner 8b, a third pair of output lines 7a (which carry the next two most significant bits) are input into the optical combiner 8c, and the final output line 7a (which carries the least significant bit) is input directly into the gate 9d.

Considering now the output of the OCRU 5 when it is fully loaded, that is to say when the most significant bit of the input header code sequence enters the splitter 7 and forms an input to the optical combiner 8a along with the second most significant bit from the arm with the delay T. Because both these input bits are '1's, and the delay on the line 7a associated with the second most significant bit is a whole bit period, the output of the optical combiner 8a has a value 2. Similarly, the optical combiner 8b has two inputs of '1's from the lines 7a with delays 2 T and 2.5 T, so its output also has a value 2. Again, the optical combiner 8c has inputs from its associated lines 7a which are both '1's (the delays on these arms being 3.5 T and 5 T), so that the output of the optical combiner 8c also has a value 2. The AND gates 9a, 9b and 9c, which respectively receive the outputs of the optical combiners 8a, 8b and 8c, are configured to switch on for a two level input, and the AND gate 9d which receives the output of the remaining line 7a from the splitter 7 is configured to switch on for a one level input. Consequently, if the OCRU 5 does receive the "correct" code 1110010, all four AND gates 9a to 9d will be turned on, and an input signal 10 from a continuous wave (cw) laser (not shown) will be passed to the bistable switch 3. In order to ensure that each of the AND gates 9c, 9b and 9a receives its input from the associated optical combiner 8c, 8b and 8a simultaneously with the cw input signal passed from the AND gate immediately upstream thereof, a respective delay fiber 10c, 10b and 10a of appropriate length is included between each pair of devices 9c and 8c, 9b and 8b, and 9a and 8a. The switch 3 will then be turned on, so that the information carried by the data field 1a of that cell whose header field 1b carries that code is passed to the associated receiver 4. It will be appreciated that a match of the code will be recognised almost instantaneously with the input of the final (most significant) bit of the code, so that the processing time of the OCRU 5 is almost zero. As the AND gates 9a, 9b and 9c are configured to operate at two-level logic, the entire OCRU 5 operates at two-level logic. This avoidance of multiple-level logic is advantageous, in that multiple-level logic is easily degraded by the noise that is always present in real systems. More importantly, however, all the gates 9a, 9b, 9c and 9d are AND gates, and so these devices can be easily implemented in a number of technologies, and in particular in semiconductor or fiber-based technologies. Simple passive components can be used for splitting, time delay and combining; and the split, delay and combine parts of the OCRU 5 could easily be fabricated in silica-on-silicon integrated technology. Also, there is no need for the first and last bits to be used to identify the start and finish of an input code sequence, so that the code efficiency of this arrangement is ~100% where there is a large number of unique codes.

Clearly, the particular form of OCRU required for each customer will depend upon the code allocated to that customer. In each case, however, the OCRU will operate at 2-level logic, and the maximum number of SLA gates will be four for a 7-bit code.

One disadvantage of the OCRU described above is that the bistable switch 3 outputs only the data field 1a of the recognised cell. An additional device such as an optical transmitter must, therefore, be provided to re-input the header field 1b for each cell not recognised. To remove the need for this additional device, the OCRU may be modified by replacing the coupler 2 with a 90/10 splitter, in which case 90% of the signal is directed towards the bistable switch 3, and 10% towards the OCRU. In this case, the header field 1b is distinguished from the data field 1a in the OCRU by its modulation speed (the modulation speed of the data field being too fast for the response time of the gates). When a header field 1b is recognised by the OCRU, the bistable switch 3 is triggered to pass the 90% part of the signal, so that header information is passed along with the data.

In another modified arrangement, the data and header fields 1a and 1b are on different wavelengths, and the coupler 2 is a 90/10 coupler. A filter is positioned between the coupler 2 and the OCRU 5 to prevent data signals reaching the OCRU. Here again, this arrangement does not require an additional laser to re-input the header field 1b. Moreover, the data and header fields 1a and 1b need not be at different speeds/bit rates.

In a further alternative, a time-dependent switch can be used to separate the header field 1b from the data field 1a. This switch would be triggered by a clock signal extracted from the main input signal.

The routing apparatus of the invention could handle any form of packetised signal, where the packets (or cells) are divided into header byte (s) and data byte (s), such as the ATM format. Although at the current agreed maximum rate of 140 Mbit/s optical routing is unlikely to be beneficial, standard agreement at higher rates could change this situation.

It will be apparent that modifications could be made to the routing apparatus described above. For example, the bistable switch 3 could be replaced by any type of 2×2 switch, either optically or electronically controlled. If the switch is electronically controlled, it will need to be provided with an opto-electronic connector. It would also be possible to replace the SLA AND gates technology by AND gates in other technologies such as fiber-based devices.

I claim:

1. An optical code recognition unit for recognizing a predetermined n-bit optical code sequence coded using the Manchester code format, the optical code recognition unit comprising an n-way splitter having an input and n parallel outputs, and a plurality of AND gates associated with the splitter outputs, respective pairs of splitter outputs leading to each of the AND gates via a respective optical combiner, and any remaining single splitter output leading directly to its AND gate, wherein each of the splitter outputs is subject to a different delay of m half bit periods, where m=0 to 2 (n−1), the values of m being chosen such that, for a predetermined optical code sequence in Manchester code applied to the splitter input, the delay period for each splitter output is such that each splitter output carrying a '1' has a delay of a whole number of bit periods and each splitter output having a delay '0' has a delay of a whole number of half bit periods or vice versa, the '1's in the outputs of each of the pairs of splitter outputs are input to the associated AND gates and the '1' in any remaining single splitter output is input to its AND gate at predetermined times such that all the AND gates are turned on.

2. An optical code recognition unit as claimed in claim 1, wherein the AND gates are positioned in series between an input device and an output device, whereby a signal input by the input device will reach the output device if the predetermined code is input to the n-way splitter.

3. An optical code recognition unit as claimed in claim 2, wherein the input to each of the AND gates except that nearest the input device is subjected to a predetermined delay, whereby the signal input by the input device will reach the AND gates at substantially the same time as said inputs.

4. An optical code recongnition unit as claimed in claim 1, wherein each of the AND gates is constituted by a semiconductor laser amplifier.

5. A system for processing packetised signals in a network comprising a head-end packet signal transmitter and a plurality of customer receivers, the system comprising a respective apparatus associated with each customer receiver, each apparatus comprising separator means for separating header field information from data field information in packets, first transmission means for transmitting the header field information to a switch associated with the respective customer receiver, and second transmission means for transmitting the data field information to said switch, wherein each first transmission means includes an optical code recognition unit as claimed in claim 1, and wherein each apparatus is such that the respective optical code recognition unit activates the associated switch to permit the passage of the data field information of a given packet only if the optical code contained in the header field information of that packet is the predetermined optical code of that optical code recognition unit.

6. A system as claimed in claim 5, wherein each of said switches is a bistable switch.

7. A system as claimed in claim 6, wherein each of the bistable switches is constituted by a semiconductor laser amplifier.

8. A system as claimed in claim 5, wherein a respective wavelength-dependent coupler constitutes the separator means of each apparatus.

9. A system as claimed in claim 5, wherein the second transmission means of each apparatus includes an optical delay fiber of such a length that the header field information of a given packet reaches the switch substantially as the switch is activated by the optical code recognition unit.

10. A system as claimed in of claim 5, wherein the network is a packet switched network, the head-end packet signal transmitter is a head-end packet transmitter, and the packets are cells consisting of headers and data.

11. An optical code recognition unit for recognizing a predetermined n bit optical code sequence coded using the Manchester code format, the optical code recognition unit comprising an n-way splitter having an input and n parallel outputs, and a plurality of AND gates associated with the splitter outputs, respective pairs of splitter outputs leading to each of the AND gates via a respective optical combiner and any remaining single splitter outputs leading directly to its AND gate, wherein each of the splitter outputs is subject to a different delay of m half bit periods, where m=0 to 2 (n−1), the values of m being chosen such that for a predetermined optical code sequence in Manchester code applied to the splitter input, the delay period for each splitter output is such that each splitter output carrying a "1" has a delay of an even number of half bit periods and each splitter output carrying a "0" has a delay of an odd number of half bit periods, the "1's" in the outputs of each of the pairs of splitter outputs are input to the associated AND gates and a "1" in any remaining single splitter output is input to its AND gate at predetermined times such that all the AND gates are turned on.

12. Manchester code optical code recognition unit comprising an n-way splitter having an input and n parallel outputs, a delay means provided at at least n−1 of the splitter outputs each having a delay of m half bit periods where m is equal to one half to two times (n−1) and m is an odd number of half bit periods for a "1" or "0" Manchester code input and an even number of half bit periods for a "0" or a "1" Manchester code input respectively, a plurality of optical combiners receiving delayed output signals from respective pairs of delay means, a plurality of AND gates coupled to receive output signals from an associated combiner and one AND gate for receiving an output directly from the n-way splitter, said AND gates being connected in series such that a series path is established through the AND gates when the optical code recognition unit receives a Manchester code matching that to which it is set.

* * * * *